United States Patent
Paz-Pujalt et al.

(10) Patent No.: US 6,987,877 B2
(45) Date of Patent: Jan. 17, 2006

(54) SUPERIMPOSING GRAPHIC REPRESENTATIONS OF GROUND LOCATIONS ONTO GROUND LOCATION IMAGES AFTER DETECTION OF FAILURES

(75) Inventors: Gustavo R. Paz-Pujalt, Rochester, NY (US); John P. Spoonhower, Webster, NY (US); David A. Parkes, Henrietta, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 712 days.

(21) Appl. No.: 10/020,745

(22) Filed: Oct. 30, 2001

(65) Prior Publication Data

US 2003/0081827 A1    May 1, 2003

(51) Int. Cl.
*G06K 9/00* (2006.01)

(52) U.S. Cl. ......................... 382/152; 382/294; 378/59; 701/213

(58) Field of Classification Search ................ 382/152, 382/104, 165, 190, 284, 276, 293, 294, 291, 382/303, 307; 701/208, 213; 340/995.1; 422/68.1, 100; 378/58, 59, 62; 405/174, 405/184, 184.1; 703/22; 428/85, 88, 89; 73/865.9, 865.8, 592, 866; 244/158 R, 159, 244/82, 113; 348/144; 342/64, 457
See application file for complete search history.

(56) References Cited

U.S. PATENT DOCUMENTS

| | | | |
|---|---|---|---|
| 4,913,558 A * | 4/1990 | Wettervik et al. | 374/4 |
| 5,341,439 A * | 8/1994 | Hsu | 382/103 |
| 6,243,483 B1 * | 6/2001 | Petrou et al. | 382/103 |
| 6,343,534 B1 * | 2/2002 | Khanna et al. | 89/1.13 |
| 6,522,285 B2 * | 2/2003 | Stolarczyk et al. | 342/22 |

* cited by examiner

*Primary Examiner*—Bhavesh M. Mehta
*Assistant Examiner*—Sheela Chawan
(74) *Attorney, Agent, or Firm*—RatnerPrestia

(57) ABSTRACT

A method for superimposing graphic representations of ground locations onto images of ground locations after detecting the presence of material failure(s) or failures in man-made structures in such ground locations including providing an image sensor spaced remotely from the ground and which sequentially captures a number of images of various ground locations to provide digital images of such ground locations; processing captured digital images to determine the presence of a potential material failure in a man-made structure in accordance with predetermined coordinate positions which locate the man-made structures in one or more of the captured digital images; identifying reference points in the ground locations corresponding to the same reference points in the graphic representations of the ground location; and superimposing the graphic representation with the reference points onto at least one of the captured digital images.

9 Claims, 6 Drawing Sheets

US 6,987,877 B2

SUPERIMPOSING GRAPHIC REPRESENTATIONS OF GROUND LOCATIONS ONTO GROUND LOCATION IMAGES AFTER DETECTION OF FAILURES

FIELD OF THE INVENTION

The present invention relates to merging and displaying graphic representations of ground infrastructure locations with remotely detected material failures of the same ground locations.

BACKGROUND OF THE INVENTION

The surveillance of ground topography is well known in the art. In ground surveillance it is highly desirable to detect whether there has been a material failure in a man-made object such as a road, a pipeline, an electrical grid, or other man-made structures of practical interest. When detected, a determination is made if remedial action must be taken. Often times a visual inspection is provided by a land-based crew that traverses an area by vehicle or foot, to determine if there is a material failure. In many cases it is required to inspect man-made structures frequently in order to determine the likelihood or development of potential material failures. In many cases these inspections are done by a ground site survey; individuals visit these locations and take measurements or other form of data on-site. Routinely the inspection crews carry a variety of maps drawings and other representations. This process becomes cumbersome, costly, inconvenient, and in many cases unreliable and unsafe due to the danger of initiating investigatory or repair work on areas where buried cables or sewer lines may be present for example. It is frequently the case that an aircraft or a satellite includes an image capture device such as a charge coupled device (CCD). Airborne photographic systems can also be used for capturing images of adjacent areas. These images are then reviewed to determine if there is a material failure. Even though a failure in a man-made object can be identified, it is sometimes difficult to determine the location of that man-made failure relative to other landmarks or locations.

SUMMARY OF THE INVENTION

It is an object of the present invention to provide an improved method for identifying the location of failures in man-made material objects shown in an image.

This object is achieved by a method for superimposing graphic or symbolic representations of objects in ground locations onto visual images of such ground locations after detecting the presence of material failure(s) or failures in man-made structures in such ground locations comprising the steps of:

(a) providing an image sensor spaced remotely from the ground and which sequentially captures a number of images of various ground locations to provide digital images of such ground locations;

(b) processing captured digital images to determine the presence of a potential material failure in a man-made structure in accordance with predetermined coordinate positions which locate the man-made structures in one or more of the captured digital images;

(c) identifying reference points in the image of the ground locations corresponding to the same reference points in the graphic representations of the ground location; and (d) superimposing the graphic or symbolic representation with the reference points onto at least one of the captured digital images.

It is useful to combine the representation of material failures captured by a remote sensor with existing plans, maps, drawings or other representations in order to make the process of remediation more effective. The process of combining various representations requires image processing and digitization of the pre-existing maps plans or drawings in such a way that registration exists between the various representations is achieved. The term "registration" is used in analogy to the graphic arts to indicate the correct overlap of various layers of image information.

It is an advantage of the present invention to provide a more effective way of presenting information related to material failures in man-made structures by automatically processing images captured from a remote platform, identifying material failures in man-made structures, and by processing pre-existing ground location information in such a way that registration exists between various sets of information. This advantage will facilitate rapid and reliable identification of the locations of material failures in man-made structures and improve the time to bring about necessary repairs.

DESCRIPTION OF THE PREFERRED EMBODIMENTS

Figure 1:
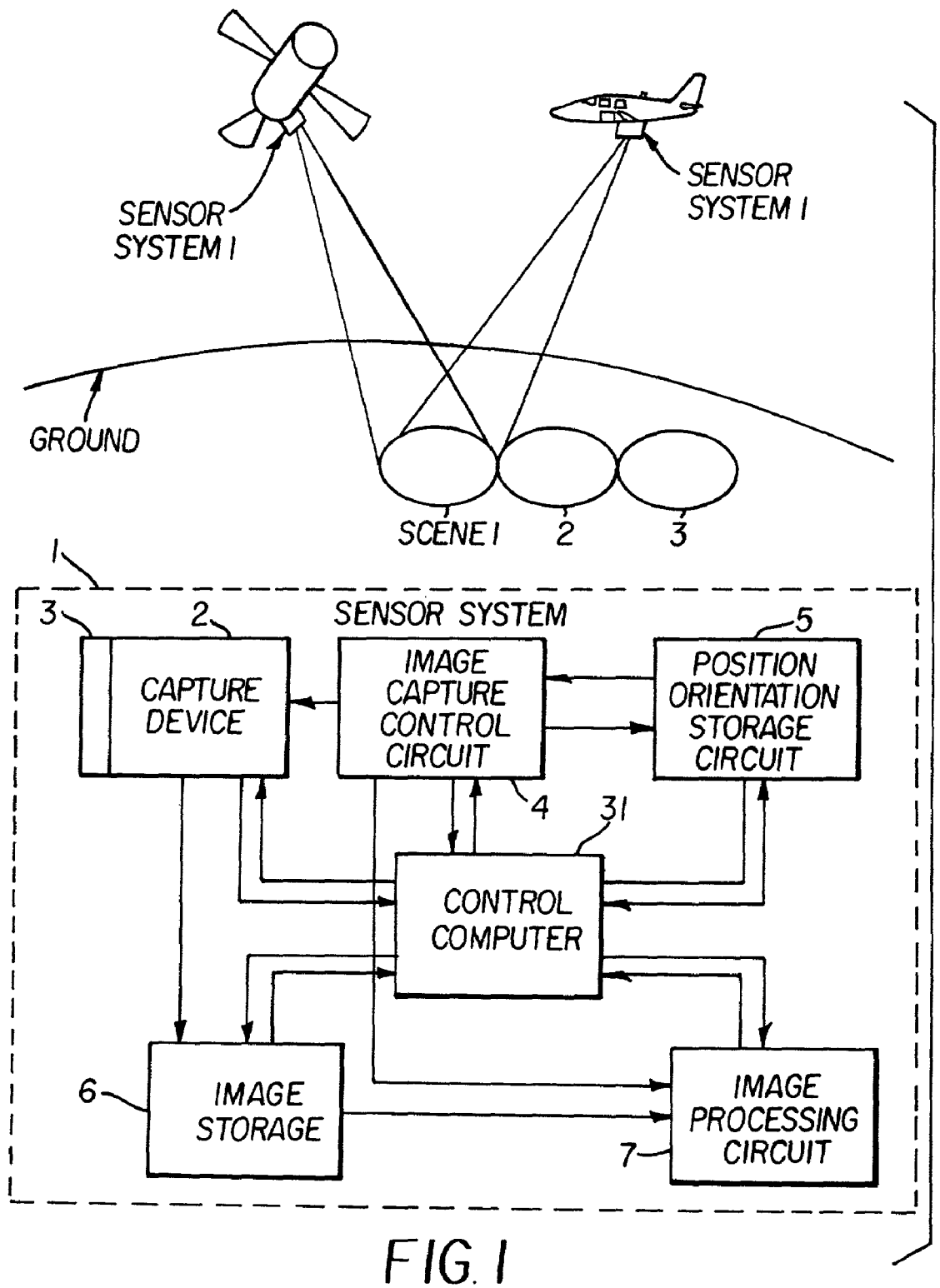
FIG. 1 depicts a system for capturing images from an airborne or a satellite platform in accordance with the present invention.

FIG. 1 displays a sensor system 1 employed in the capturing of images in order to identify material failures in man-made structures. An image sensor spaced remotely from the ground sequentially captures a number of images of various ground locations; it may be located in a fixed structure or mounted on either an aerial or a satellite platform, for example. Images of the ground containing various man-made structures such as roadways, pipelines, electrical power lines, agricultural, mining, real estate activity and the like are captured by this sensor system 1. The term "man-made structure" can also include other human activities such as insecticide spraying which after application can be detected by sensor system 1. Sequential images may be captured in digital form and either stored in the aerial or satellite platform to be transferred later or transmitted via a radio link to a control ground station. The capture device 2 includes an electronic sensor, typically a CCD or complementary metal oxide semiconductor (CMOS) imaging array that along with some imaging optics captures a picture of the scene in electronic form. In some instances a special optical filter 3 is attached to the input to the CCD or CMOS detector to filter the light wavelengths which are incident upon the detector. This optical filter 3 is chosen so as to maximize the signal-to-noise ratio for the detection of a specific type of material failure. Alternatively, the ground location image can be captured by conventional photographic cameras. Film images would then have to be converted to digital images by an image scanner that includes an image sensor. The system 1 also has an image capture control circuit 4 that sequences the operation of the capture device 2. As will be clear from FIG. 1, the operation of the various elements shown in system 1 are under the control of a control computer 31. The image capture control circuit 4 controls capture device 2 and sends position and orientation information to a position and orientation storage circuit 5 with each captured image. Position information in the form of spatial coordinates can be provided by the customer in order to identify the location of man-made structures of interest. Such position information is also stored in position and orientation storage circuit 5. Position and orientation data are used along with predetermined coordinate positions to locate the man-made structures in the captured image. Control computer 31 causes image data to be stored in image storage 6 and can be processed to identify features of a scene in image processing circuit 7. The processing sequence is also directed by control computer 31 of the image data in this instance is to enhance the capability of the system 1 to identify material failures in man-made structures. The image processing circuit 7 includes a storage memory (not shown) that includes a representation of different material failures to be detected and comparing the captured digital image with the material failures to determine the presence of a material failure, type of material failures and location of the material failures. With the exception of the capture device 2, the various elements of the system 1 may be located either in the remote platform or at the ground station location. Moreover, many of the elements described can be embodied in software that can be understood to be within the control computer 31. The capture device 2 is located in either the aerial or satellite platform or a fixed structure spaced above the ground.

Figure 2:
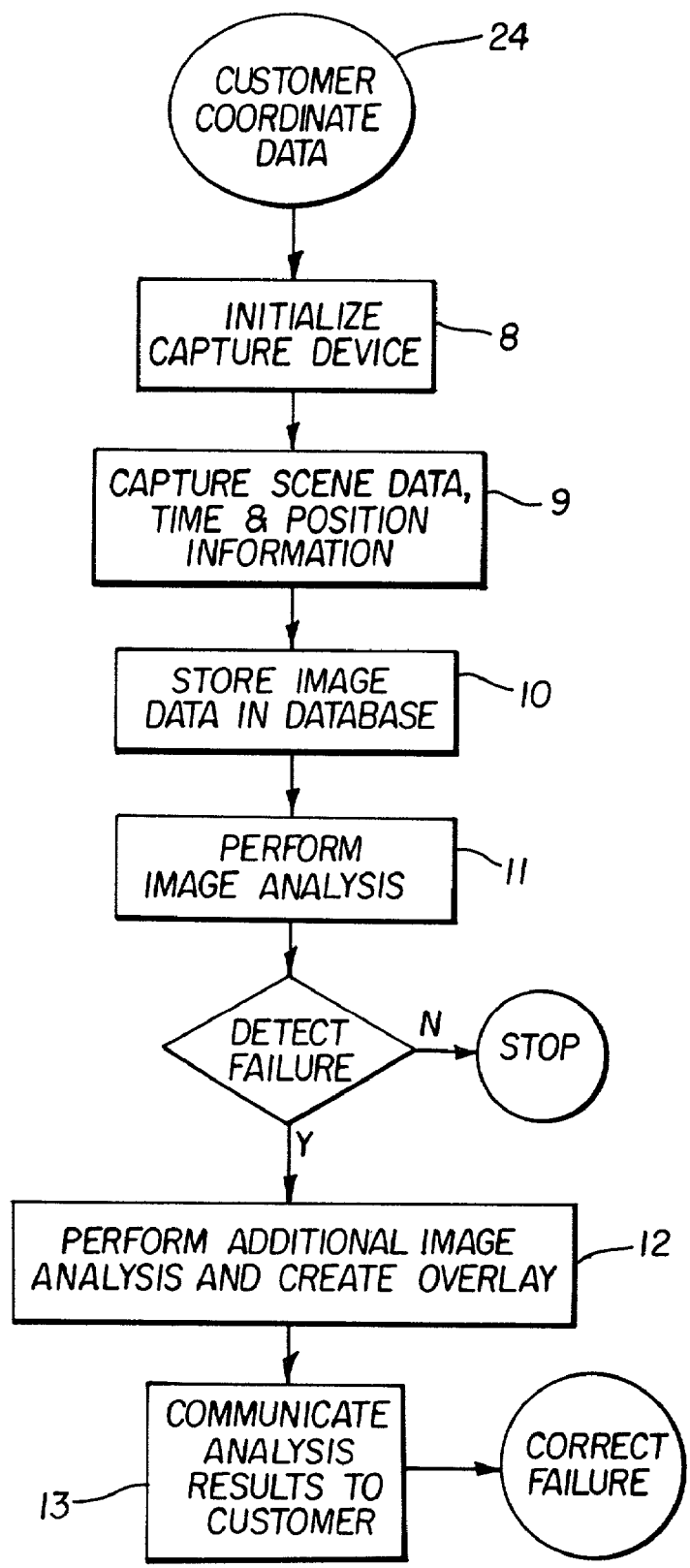
FIG. 2 is a flowchart in block diagram form of the process of capturing and processing images to detect potential material failures in man-made structures.

The overall process for detecting material failures in man-made structures is depicted in flowchart form in FIG. 2. The flowchart is in block diagram form and those skilled in the art will appreciate that many of the functions are controlled by the control computer 31. The starting event includes initializing the capture device 2 and image storage 6 to erase any previously captured scene data. This first step is accomplished in block 8. Next a new scene is captured in block 9 using the position information supplied by a customer 13 to trigger recording of the images. The image data along with position and time information necessary to identify the location and time of the current scene is stored in order to facilitate comparison with the same scene taken at other times. Image and other data are stored in a scene database 10 in order to perform such comparisons at a future time. Image analysis 11 is next performed in order to identify changes in the scene and facilitate identification of material failures in the man-made structures that appear in the scene. The latest scene image is compared with image data that has been previously stored in the scene database 10. If a material failure is not detected the process stops. Detection of a material failure may initiate further image analysis or the superimposition of graphic representations in block 12 as required by the customer 13. The identification and superimposition process finishes with the results of the analysis communicated to the customer 13. The communication make take many forms, for example a telephone contact or e-mail notification of the detection of the material failure. The final step in the overall process is to correct the material failure.

In many cases it is required to inspect man-made structures frequently in order to determine the likelihood or development of potential material failures or to initiate repairs of such structures. In many cases these inspections are done by a ground site survey; individuals visit these locations and take measurements or other form of data on-site. Routinely the inspection crews carry a variety of maps, drawings and other representations. This process becomes cumbersome, costly, inconvenient, and in many cases unreliable and unsafe due to the danger of initiating investigatory or repair work on areas where buried cables or sewer lines may be present for example. Routinely there exist graphic representations of ground locations like engineering drawings, plans or maps. These representations generally exist with specific scales, specialized symbols and legends that make them useful to interested parties. Examples are street maps, instrument surveys of land and buildings; surveys of the transportation grid, power grid, sewer lines, above ground and underground telephone, electric, cable lines etc. These data in graphic representation or symbolic form may be combined with image data identifying failures in man-made structures.

Figure 3:
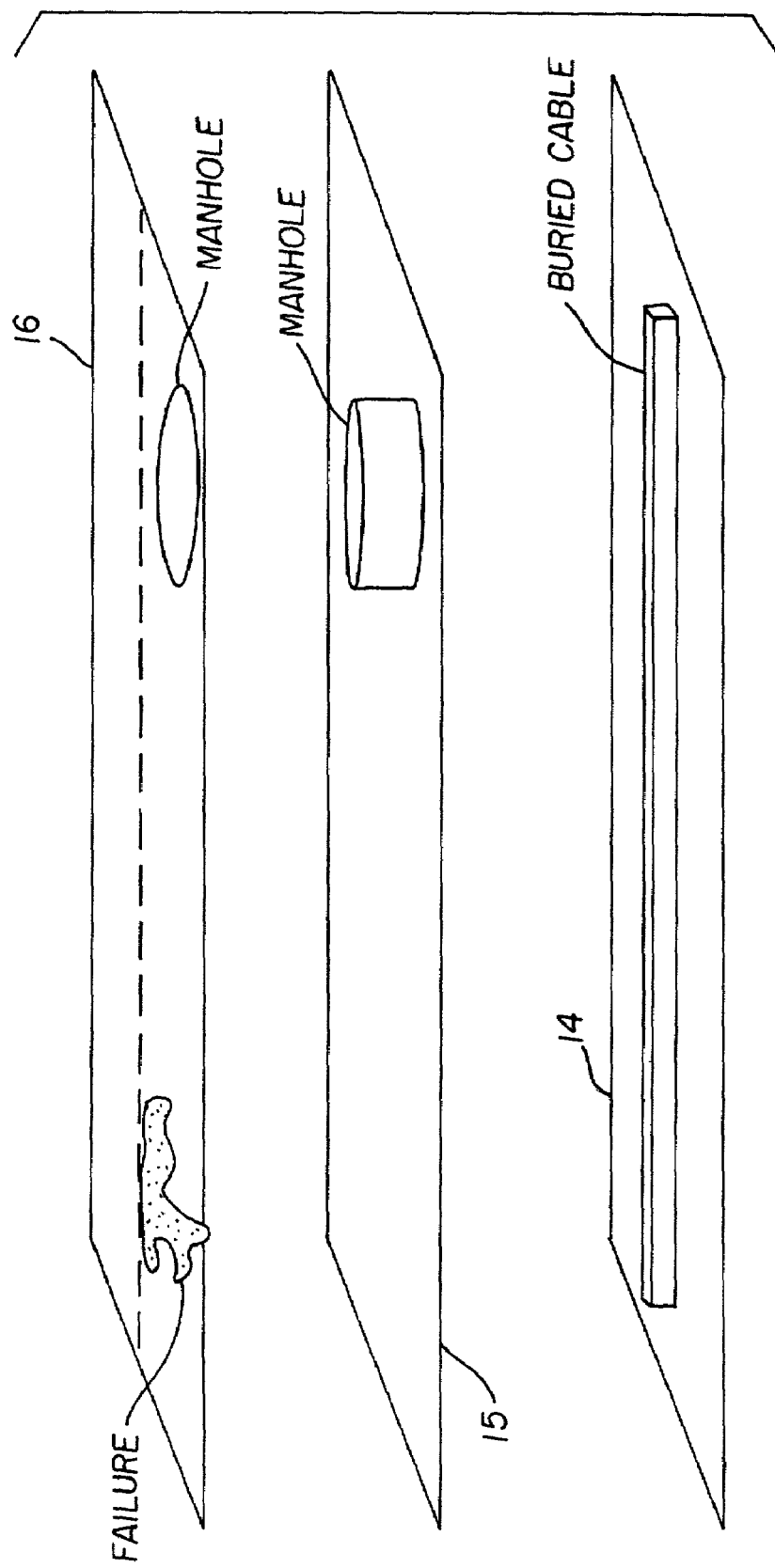
FIG. 3 illustrates the combination of images and graphic or symbolic representations.

FIG. 3 shows such a combination of images with graphic representations. In FIG. 3, graphic representations obtained from two separate plans, a power grid plan 14 and a water/sewer grid plan 15 are combined or superimposed with an image of a road captured remotely 16 to clearly depict the location of certain man-made structures and a failure in the roadway. Plan 14 depicts the power grid plan illustrating the location of buried power cable while water/sewer grid plan 15 depicts the location of a manhole obtained from a water/sewer grid plan. These two features are identified and their location clearly marked in the image of the roadway 16 as graphic representations. A failure in the roadway 16 is also identified and marked in the image 16. The failure was detected and located by the methodology described above and illustrated in FIGS. 1 and 2.

Figure 4:
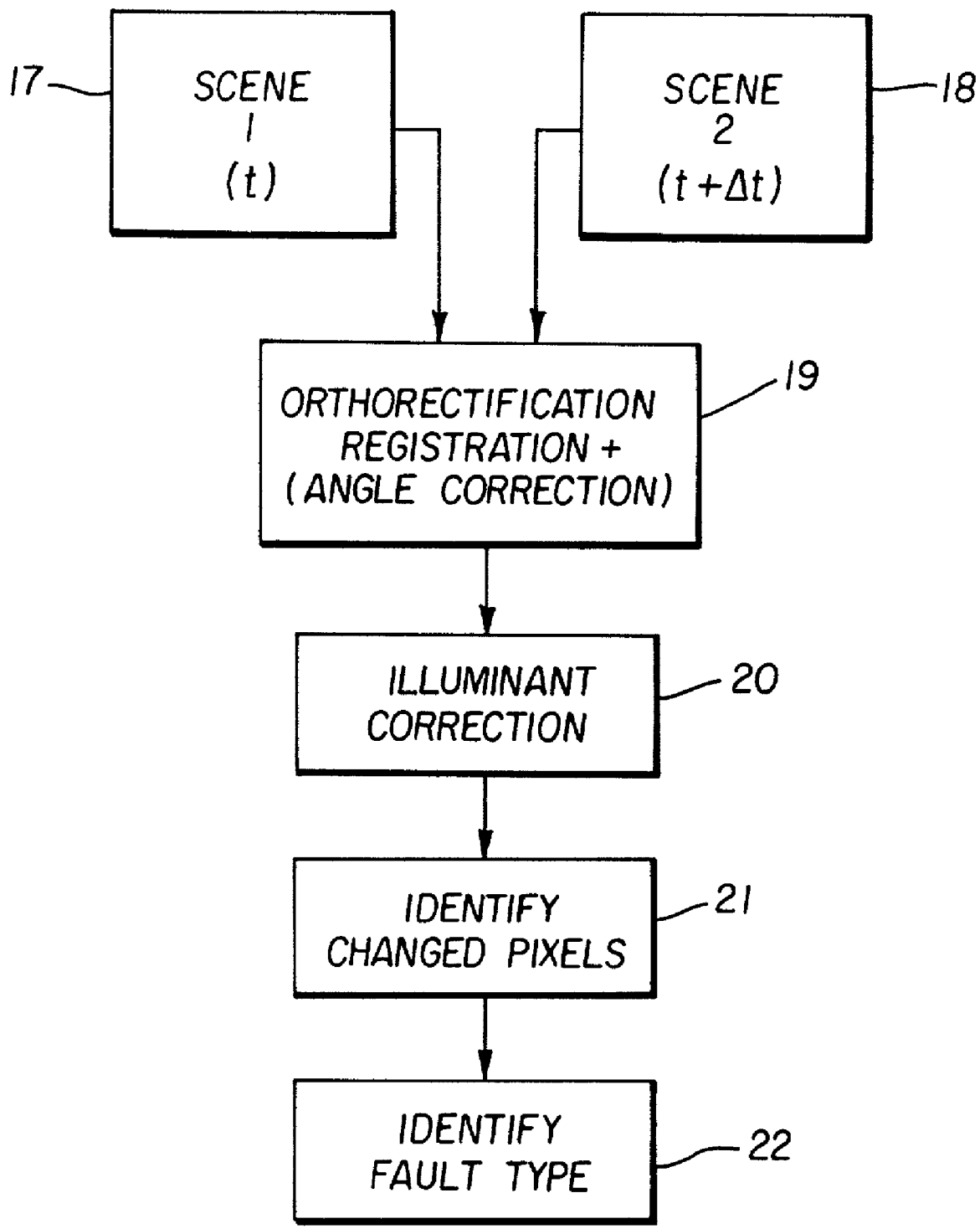
FIG. 4 is a flowchart in block diagram form of an image processing algorithm which can be used in the system shown in FIG. 1 to identify material failures in man-made structures.

FIG. 4 depicts the algorithm used to process image data files from a database and identifies material failures if they have occurred. Two separate data files, scene (1) 17 and scene (2) 18, are made available for comparison. Both data files contain the same scene content, but they typically record images taken at different times. That is, the time between capturing the two images differs by a time Δt. Both image files or scenes undergo the process of orthorectification 19, that is, compensation for variations in position and angle at the time the scenes were recorded. This process is performed in order to allow an exact pixel by pixel comparison of the elements of a scene or image. It may or may not be necessary to correct the data in each scene for differences in the illumination 20 at the time each scene was recorded. Changes in the scene are identified in block 21 are used by the control computer 31 by detecting, using software, differences in the pixel content of the two scenes to be compared. Such changes may be reflected in the intensity of the pixels, or in the shape of an object, corresponding to a finite collection of pixels. Such methods for identification of pixel or object changes are well known to those skilled in the art. On the basis of such pixel changes the material failure type is identified in block 22.

Figure 5:
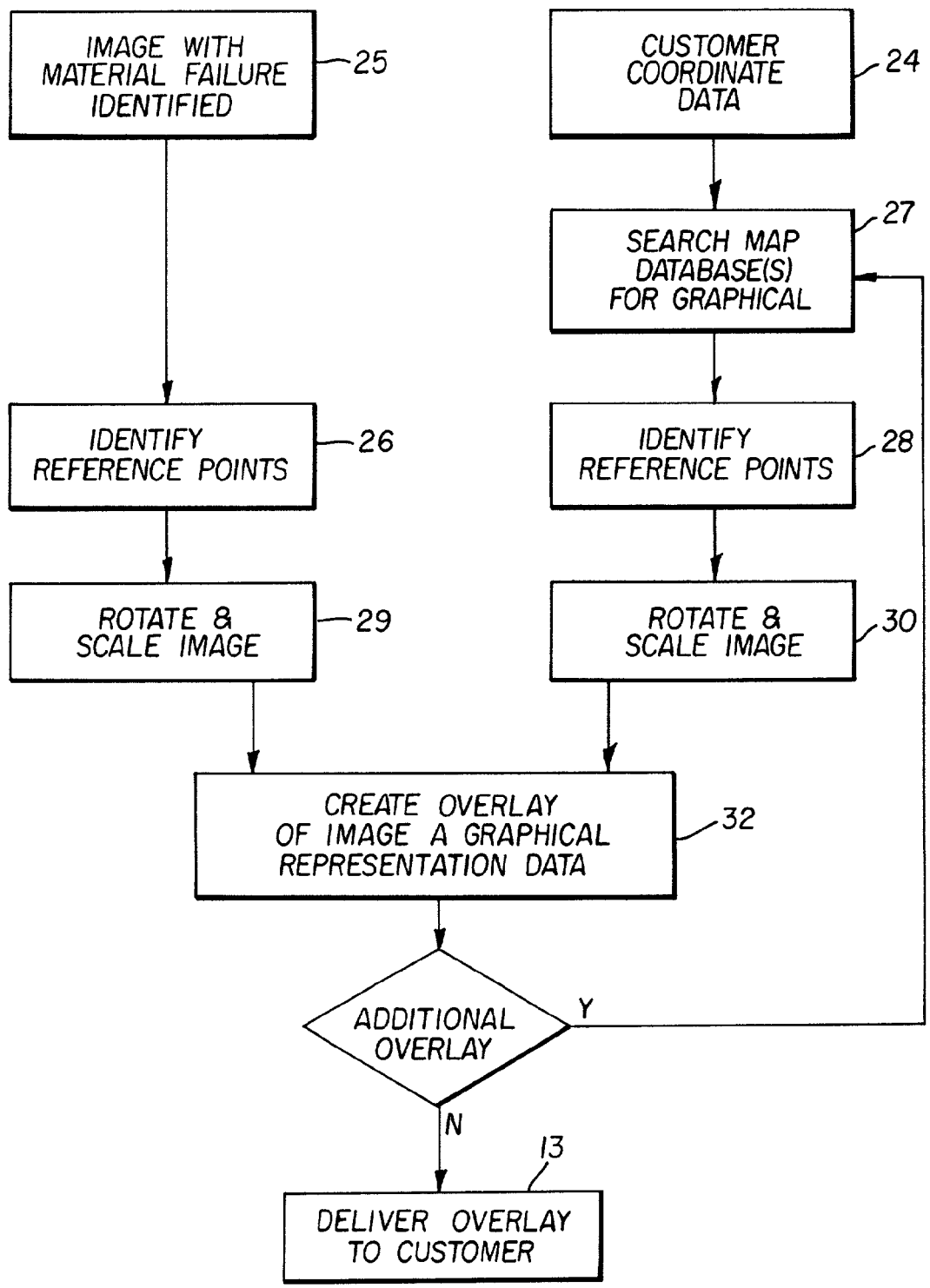
FIG. 5 illustrates in block diagram form the process of combining images and graphic or symbolic representations.

Following the steps of image capture and detection of material or potential material failures, the images are superimposed on existing graphic representations of the area in question where different forms of representation will serve to enhance the merged information. It is to be understood that the images to be superimposed can include previously captured digital images as well as current images of a scene. FIG. 5 depicts in somewhat greater detail the process of superimposing the graphic representation with the reference points onto at least one of the captured digital images to create a superimposition or overlay of graphic or symbolic representations with an image in which a fault has been identified. The image with the material failure identified 25 is processed to identify reference points in thescene 26. In parallel with this operation, customer coordinate data 24 is used to search the appropriate map database 27 for symbolic content that is relevant to the current area of concern. Reference points in the graphic representation 28 corresponding to the same reference points in the image of the ground location are also identified in the graphic representation or map selected from the map database 27. These common reference points 26 and 28, and the original customer coordinate data 24, are used in scaling and rotating operations 29 and 30, both the image with the identified material failure and the graphic representation or map. In this manner both the image and the graphic representation depict the same scene and are properly registered. A superimposition or overlay 32 is created wherein the important reference points and structures as communicated by the customer 13, are shown in the image with the material failure identified and properly positioned. If additional overlays 32 are required the process is repeated with a search of an appropriate map database and additional processing of the same type. In this manner multielement overlays can be created according to the customers specification regarding the type of structures that need to be identified. Such superimpositions or overlays can include further encoding with color or other symbols to identify predetermined areas of interest. The customer 13 may receive either layered information as a whole or in superimposable layers in either soft (electronic) display or printed hardcopy forms. Furthermore, the customer may be supplied combined sets of graphic representations including that an indication that there is potential material failure detected in a predetermined coordinate position. All of the various modes of delivery and variation in output type are depicted in block 13.

Figure 6:
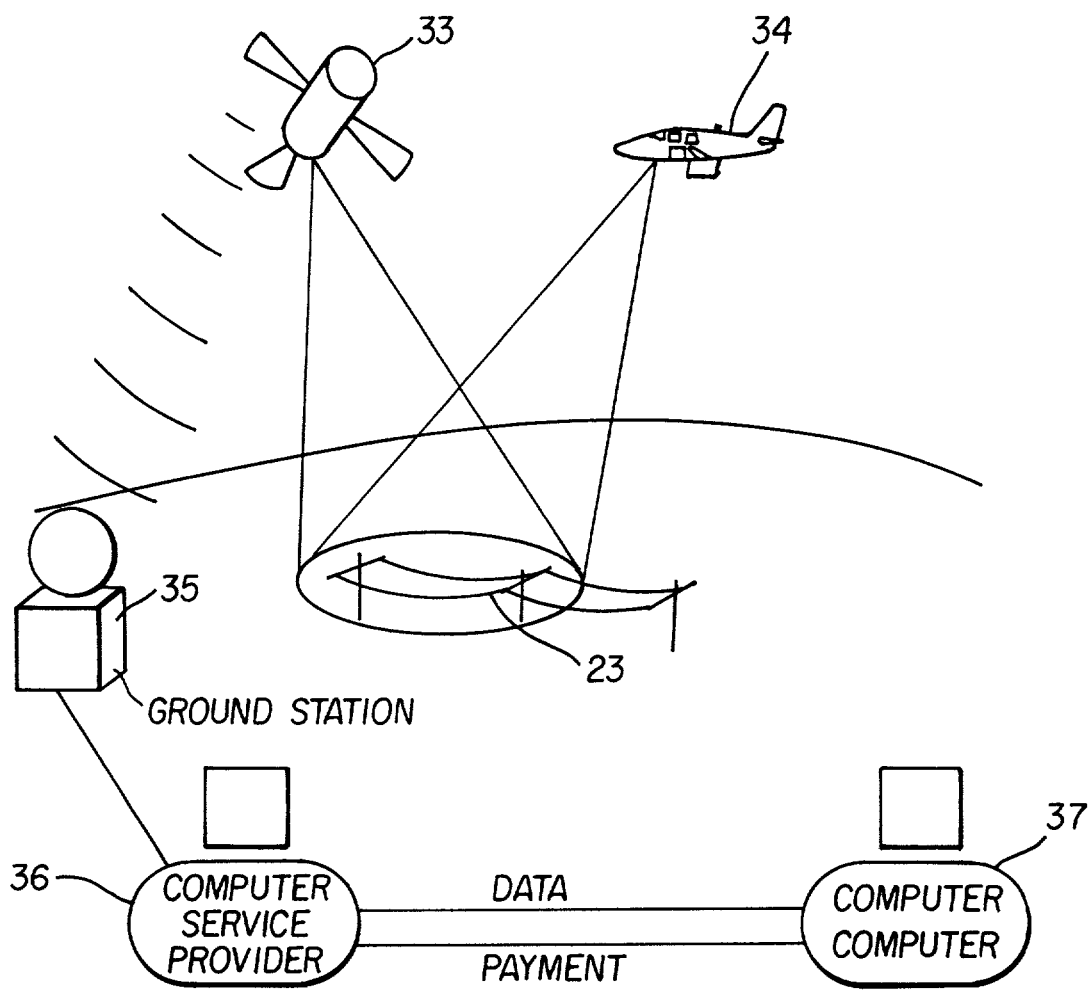
FIG. 6 illustrates the capturing of an image, analysis to identify a potential material failure, combination with other representations, and communication over a channel to deliver information to and receive payment from a customer.

FIG. 6 illustrates the entire process of capturing of an image, analysis to identify a material failure, creating the overlay, and communication over a computer network to deliver information to and receive payment from the customer 13. A satellite 33 or an aerial platform 34 captures an image of a scene 23 that contains a man-made structure (in this case electrical utility lines) to be analyzed. The image data is transmitted to a ground station 35 and transferred to the service provider's computer system 36. The image data is analyzed as previously described to determine whether a material failure has occurred and to create the overlays as requested by the customer 13. The analyzed image data is digitally superimposed with pre-existing graphic representations 14 and 15 of the ground location. The customer 13 for the service receives notification of the failure via a channel for example, a computer network such as the Internet, or via other means, such as telephony. The customer computer 37 receives the notification directly from over the computer network. The customer 13 subscribes to the service and pays for the service via the computer network. In this manner, the timely delivery of information regarding the status of a failure can be transmitted to the customer and the quality of service can be assured to be at a sufficiently high level.

The invention has been described in detail with particular reference to certain preferred embodiments thereof, but it will be understood that variations and modifications can be effected within the spirit and scope of the invention. For example, the control computer 31 can itself be reprogrammed from a remote location and would include all the necessary communication links to permit such reprogramming.

| PARTS LIST | |
|---|---|
| 1 | sensor system |
| 2 | capture device |
| 3 | optical filter |
| 4 | capture control circuit |
| 5 | position and orientation control circuit |
| 6 | image storage |
| 7 | image processing circuit |
| 8 | initialization block |
| 9 | capture scene data, time and position information block |
| 10 | scene database |
| 11 | image analysis |
| 12 | image analysis and create overlay |
| 13 | customer communication |
| 14 | power grid plan or map |
| 15 | water/sewer grid plan or map |
| 16 | image of roadway captured remotely |
| 17 | image of scene at time t |
| 18 | image of scene at time t + Δt |
| 19 | orthorectification |
| 20 | illumination correction |
| 21 | identify changed pixels block |
| 22 | identify fault type block |
| 23 | scene |
| 24 | customer coordinate data |
| 25 | image with identified material failure |
| 26 | reference points |
| 27 | map database |
| 28 | reference points |
| 29 | scaling operation |
| 30 | rotating operation |
| 31 | control computer |
| 32 | overlay creation |
| 33 | satellite |
| 34 | aerial platform |
| 35 | ground station |
| 36 | service provider's computer system |
| 37 | customer computer |

What is claimed is:

1. A method for superimposing graphic representations of ground locations onto images of ground locations after detecting the presence of material failure(s) or failures in man-made structures in such ground locations comprising the steps of:
   (a) providing an image sensor spaced remotely from the ground and which sequentially captures a number of images of various ground locations to provide digital images of such ground locations;
   (b) processing captured digital images to determine the presence of a potential material failure in a man-made structure in accordance with predetermined coordinate positions which locate the man-made structures in one or more of the captured digital images;
   (c) identifying reference points in the ground locations corresponding to the same reference points in the graphic representations of the ground location; and
   (d) superimposing the graphic representation with the reference points onto at least one of the captured digital images.

2. The method of claim 1 further including scaling the digital images to match or register with the graphic representation of ground location.

3. The method of claim 1 further including encoding with color or other symbol predetermined areas of interest.

4. The method of claim 1 further including displaying the layered information as a whole or in superimposable layers in either soft display or printed hardcopy.

5. The method of claim 1 further including supplying to a customer combined sets of graphic representations including that an indication that there is potential material failure detected in a predetermined coordinate position.

6. The method of claim 1 further including:
 (e) sending captured processed digital images with detected potential material failures to a customer.

7. The method of claim 6 wherein the digital image processing includes comparing previously captured digital images with newly captured digital images to determine variations in the captured digital images at the predetermined coordinates which indicate a potential material failure in a man-made structure.

8. The method according to claim 1 further including providing an image capture device which is located in a fixed structure position above the ground location or in a moving structure such as an aircraft or satellite.

9. The method of claim 1 further including storing in memory a representation of different material failures to be detected and comparing the captured digital image with the material failures to determine the presence of a material failure, type of material failures and location of the material failures.

* * * * *